United States Patent [19]

Hurlow

[11] Patent Number: 4,583,417

[45] Date of Patent: Apr. 22, 1986

[54] TWO-CABLE SHIFTING MECHANISM FOR TRANSMISSIONS

[75] Inventor: Robert H. Hurlow, Bainbridge Island, Wash.

[73] Assignee: Cablecraft, Inc., Tacoma, Wash.

[21] Appl. No.: 623,977

[22] Filed: Jun. 25, 1984

[51] Int. Cl.$^4$ ............................................. G05G 9/16
[52] U.S. Cl. ............................ 74/473 R; 74/471 XY; 74/501 R
[58] Field of Search ....... 74/471 XY, 473 R, 473 SW, 74/501 R

[56] References Cited

U.S. PATENT DOCUMENTS

| | | | |
|---|---|---|---|
| 2,280,047 | 4/1942 | Nampa | 74/473 R |
| 2,280,157 | 4/1942 | Mead | 74/473 SW |
| 2,497,930 | 2/1950 | Creson | 74/473 SW |
| 2,547,317 | 4/1951 | Gustafson | 74/473 R |
| 3,541,877 | 11/1970 | Houk | 74/471 |
| 3,604,284 | 9/1971 | Houk | 74/491 |
| 4,143,560 | 3/1979 | Kinkade et al. | 74/473 R |
| 4,152,950 | 5/1979 | Langford | 74/471 XY |
| 4,270,403 | 6/1981 | West | 74/473 R |
| 4,458,549 | 7/1984 | Tani et al. | 74/473 R |

FOREIGN PATENT DOCUMENTS

| | | | |
|---|---|---|---|
| 59-36829 | 2/1984 | Japan | 74/473 R |
| 2068065A | 8/1981 | United Kingdom | |

*Primary Examiner*—Allan D. Herrmann

*Attorney, Agent, or Firm*—Christensen, O'Connor, Johnson & Kindness

[57] ABSTRACT

In a remote shifter for a vehicle transmission, a transmitter unit is located near the vehicle operator while a receiver unit is mounted on the transmission. The transmitter and receiver are coupled by flexible push-pull cables that transfer the motion of a gearshift lever operated by the vehicle operator to the transmission to select and engage the desired gears in the transmission. The shift lever is operable in two independent modes of pivotal motion about orthogonal axes. Motion in a first mode controls gear rail selection in the transmission and motion in a second mode controls gear engagement. The transmitter couples the gearshift lever to the cables so that pivotal motion of the gearshift lever in a transverse plane is translated to linear motion of the select control cable while pivotal motion of the gearshift lever in the fore/aft plane is translated to linear motion of the shift control cable. The transmitter maintains the motion of the two cables independent of one another. The receiver translates linear motion of the select control cable into linear motion of an output shaft that couples the receiver to the vehicle transmission and translates linear motion of the shift control cable into rotational motion of the same output shaft. The receiver linkage maintains independence of the motions of each of the cables and maintains independence of the two modes of motion of the output shaft.

8 Claims, 9 Drawing Figures

TWO-CABLE SHIFTING MECHANISM FOR TRANSMISSIONS

BACKGROUND OF THE INVENTION

This invention relates to improvements in remotely controlled actuator mechanisms requiring two independent modes of motion and, more particularly, relates to an improved push-pull cable system for shifting gears in a vehicle transmission by operation of a gearshift lever remotely located from the transmission.

In the present state of the art in situations in which a vehicle transmission is remotely located from the vehicle operator, such as in a cab-over design track or in a bus with a rear engine, systems of torque tubes and rigid links are used to transmit control motion of the gearshift lever by the operator to the vehicle transmission. In order to simplify installation of the transmission control mechanism it is possible to utilize flexible coaxial push-pull cables to operate the transmission mechanism by remote control.

When using flexible push-pull cables for such remote actuation of the transmission, cable friction and backlash are important factors to be considered. Also, it is necessary to fit the linkage system into a relatively small and predetermined space envelope. Typically, two independent modes of motion are used in controlling the transmission, motion in one mode being used to select the gear rail on which the desired gears are located in the transmission and the second mode of motion being utilized to actually shift the transmission to the desired gears. In order to obtain proper operation of the transmission, it is necessary to keep the motion in the two modes independent of each other and any linkage that is used to transfer motion from the operator to the transmission must minimize interaction between motion in the two modes.

SUMMARY OF THE INVENTION

In accordance with the present invention, a transmitter unit is located in close proximity to the vehicle operator and is under the operator's control through means of a transmitter unit control member, for example, the gearshift lever. The lever is guided for motion in a first mode, such as fore and aft, so as to move a crank arm through an angular range and produce longitudinal displacement of a first push-pull cable that will be designated as the shift cable through a coupling of such cable to a receiver unit, which is located adjacent the transmission to effect shifting of the transmission.

The gearshift lever is also movable in a side-to-side motion by one operator pivoting the lever about the fore/aft axis of the cab. The side-to-side motion is transformed by a linkage mechanism to a longitudinal displacement of a second push-pull cable that will be designated as the select cable, which, again, is coupled to a linkage in the receiver unit to effectuate selection of the desired gear rail in the transmission. The linkage connecting the gearshift lever with the shift cable is so related to the linkage connecting the gearshift lever to the select cable that there is substantially no interaction between the longitudinal movement of the two push-pull cables as the gearshift lever is moved in each of the two modes of motion.

While the transmitter described can be used with any receiver capable of accepting longitudinal movement of two independent cables to effect operation of the transmission, for example, the receiver unit described in my copending patent application Ser. No. 340,537, filed Jan. 19, 1982, now U.S. Pat. No. 4,483,211 a preferred embodiment of the receiver of the present system is useful for connection of the transmitter to a transmission of the type manufactured by Zahnradfabrik Friedrichshafen of Friedrichshafen, West Germany and provides a selection linkage connected to the select cable that transforms the longitudinal motion of the select cable into a longitudinal linear motion of an output rod connected to the transmission to select the desired gear rail. The shift cable from the transmitter is connected to a second linkage in the receiver that transforms the longitudinal motion of the shift cable to a rotational motion of the output rod to effectuate actual engagement of the desired gears in the selected gear rail. As in the transmitter, the motion of the first and second linkages in response to the motion of the shift and select cables is independent, one of the other.

BRIEF DESCRIPTION OF THE DRAWINGS

The above-described features and advantages of the invention, as well as the operation of the invention will become more clear to those of ordinary skill in the art and others upon reading the ensuing specification when taken in conjunction with the appended drawings wherein.

DETAILED DESCRIPTION OF THE PREFERRED EMBODIMENT

Figure 1:
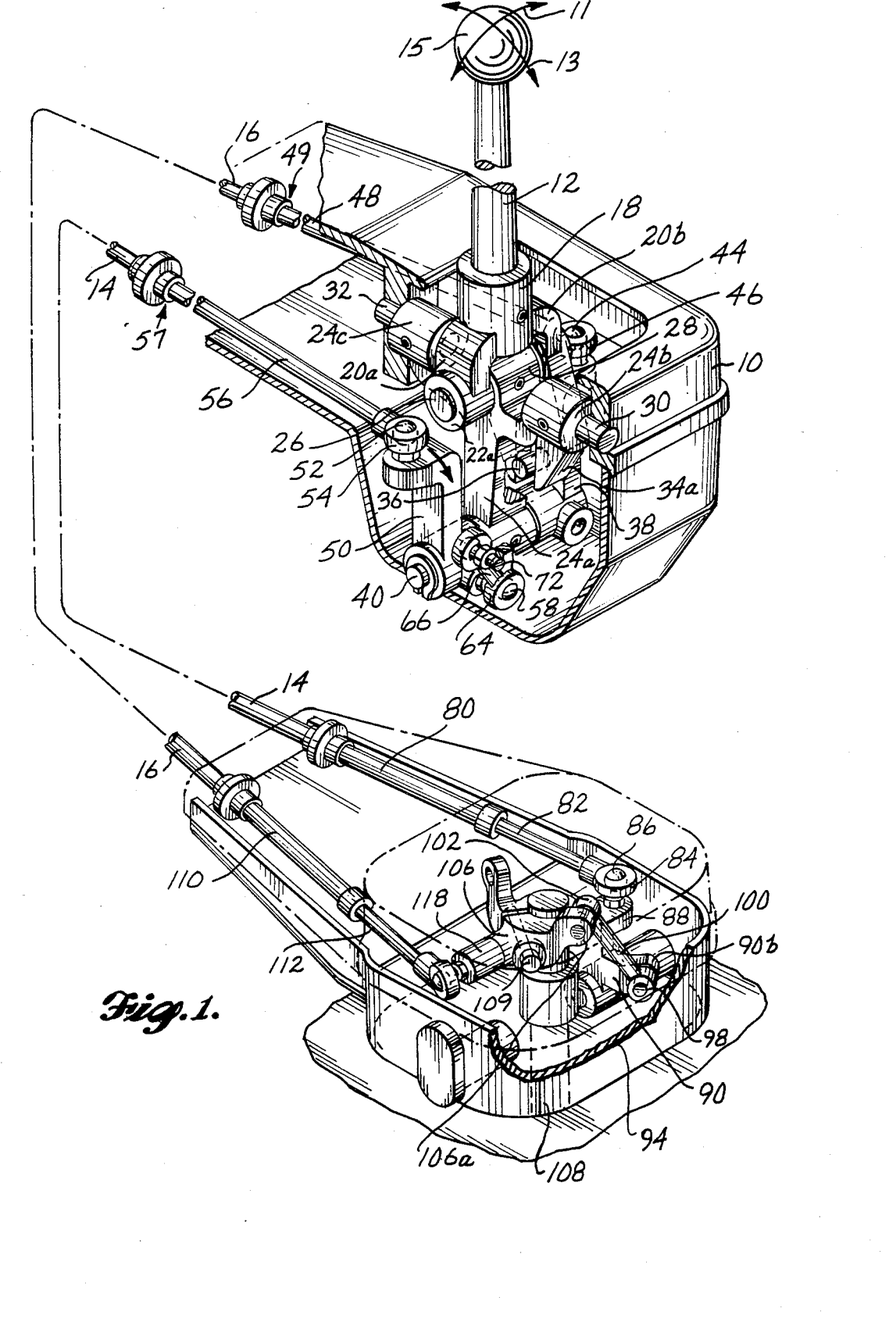
FIG. 1 is an isometric view of a preferred embodiment of a transmitter and receiver assembly interconnected in working relationship with one another made in accordance with the principles of the present invention.

FIG. 1 illustrates a preferred embodiment of a transmitter assembly made in accordance with the principles of the present invention for allowing an operator located remotely from a mechanical transmission to shift the gears in the transmission. The transmitter assembly is housed within a casing 10 and is typically mounted beneath the floor of a truck cab adjacent the operator and a shift lever 12, a portion of which is illustrated in FIG. 1, extends upwardly through the floor of the cab to be grasped by the operator. The gearshift lever 12 is typically operable in two modes of motion. Movement in a first mode of motion effectuates selection of one of the gear rails in the remote transmission unit (not shown) and operation in the second mode causes selective engagement of one of the drive gears in the transmission unit associated with the gear rail that has been selected. In the preferred embodiment, shown in FIG. 1, the gear rail selection is accomplished by movement of the shift lever 12 side to side as shown by arrow 11, while engagement of the gear selected is accomplished by movement of the gearshift lever 12 in a fore/aft direction, as shown by arrow 13. As will be described later, movement of the gearshift lever 12 is transformed into associated longitudinal movement of first and second push-pull cables 14 and 16 that are connected to linkages in a receiver unit, also shown in FIG. 1, mounted adjacent the transmission unit. The receiver accepts the longitudinal movement of the respective push-pull cables and transforms the motion into the proper motion required to accomplish gear selection and engagement in the transmission.

Figures 2, 3:
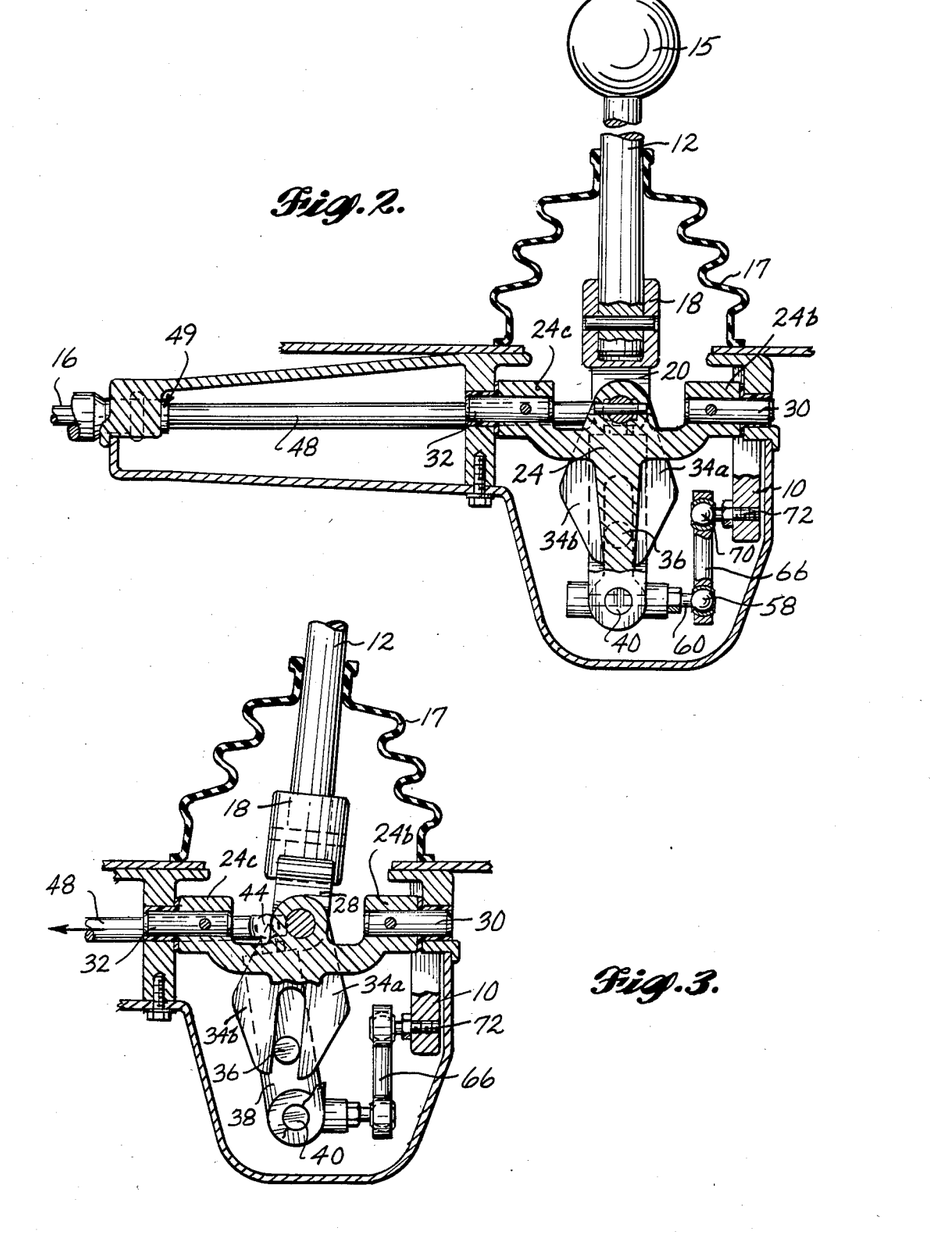
FIG. 2 is a side elevational view in partial section of the transmitter assembly of FIG. 1 in the neutral position.
FIG. 3 is a side elevational view in partial section of a portion of the transmitter assembly of FIG. 1, showing a forward displacement of the gearshift lever.
Figures 4, 5, 6, 7:
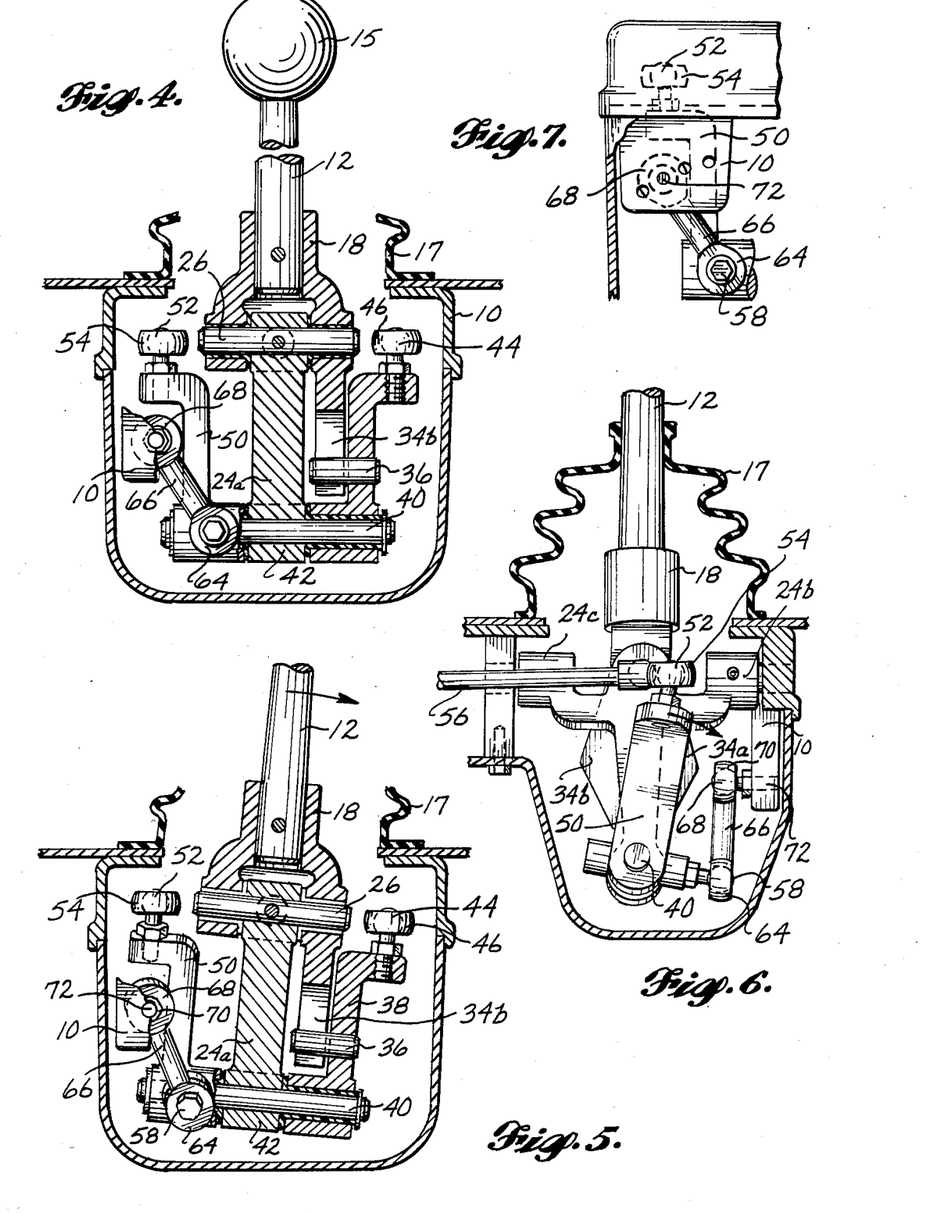
FIG. 4 is a front elevational view in partial section of the transmitter assembly of FIG. 1, in the neutral position.
FIG. 5 is a front elevational view in partial section of the transmitter assembly shown in FIG. 1, showing a sideways displacement of the gearshift lever.
FIG. 6 is a side elevational view in partial section of the transmitter of FIG. 5 with the same sideways tilt of the gearshift lever.
FIG. 7 is a front elevational view of a portion of the transmitter of FIG. 1, showing a portion of the casing.

The gearshift lever 12 fits within a bore of collar 18 and is shown in FIGS. 1, 2 and 4 in essentially the neutral position. The lever 12 is pinned to the collar 18 so that the lever 12 cannot rotate within the collar. The collar 18 is integrally formed with a yoke 20 that includes first and second arms 20a and 20b, each of the arms having associated collars 22a and 22b formed at their ends. Coaxial bores are formed within the collars 22a and 22b, the axis of the bores being oriented transversely with respect to the cab. The yoke 20 is pivotally connected to a center arm 24 by a pin 26 that passes through the bores in each of the collars 22a and 22b and a bore formed coaxially in an ear 28 formed at the top of the center arm 24. The gearshift lever can then be moved in a fore/aft direction and will pivot about the transversely oriented pin 26. The center arm 24 includes a downwardly extending finger 24a and an upwardly opening yoke portion that culminates in two spaced collars 24b and 24c located on opposite sides of the ear 28. The collars 24b and 24c have coaxial bores formed therein, the axis of the bores lying parallel to the fore-/aft axis of the cab. Pins 30 and 32, respectively, are inserted into the bores in the collars 24b and 24c and are mounted within holes formed in the casing 10 of the transmitter assembly. The center arm 24 is therefore mounted for swinging movement about the axis of the pins 30 and 32 as the gearshift lever 12 is moved in a transverse direction.

The collar 22b has a fork member extending downwardly and integrally formed with the collar, the fork member having fingers 34a and 34b spaced from one another to form an elongated slot between the fingers. Trapped within the slot is a pin 36 that extends in a transverse direction from a shift crank arm 38 that is mounted for swinging movement about an axis parallel to the transverse axis of the cab on a pin 40 that passes through a collar 42 formed on the lower end of the finger 24a of center arm 24. The upper end of the shift crank arm has mounted thereon the ball element 44 of a ball-and-socket coupling. The complementary socket member 46 is carried by a slide rod 48 that is a part of a terminal assembly 49 attached to shift cable 16. Movement of the shift lever 12 in the fore/aft direction pivots the yoke 20 about the pin 26 and causes the fork fingers 34a and 34b to move the pin 36 in a fore/aft direction, which, in turn, pivots the shift crank 38 about the pin 40. As the shift crank pivots in a fore/aft plane, the ball-and-socket coupling 44, 46 is carried with the crank and causes a linear movement of the shift cable 16 in the fore/aft or longitudinal direction.

The interaction between the movement of the shift lever 12 and the shift cable 16 is more clearly shown in FIGS. 2 and 3. In FIG. 2, the shift lever is in essentially a neutral position. A boot 17 of rubber or other flexible material surrounds the lever 12 and seals the transmitter unit against entry of dirt and moisture without impeding motion of the gearshift lever 12 in either mode. The fork fingers 34a and 34b are upright as is shift crank 38. In FIG. 3, the shift lever 12 is shown canted to the right, which corresponds to a forward movement of the lever. The yoke 20 and the fork member pivot about pin 26 and the finger 34a pushes the pin 36 to the left. The force on pin 36 causes the shift crank 38 to pivot to the left about the pin 40 thereby moving the ball and socket coupling 44, 46 to the left. As the coupling 44, 46 moves to the left, the slide rod 48 moves to the left causing the shift cable 16 to also move to the left. While not illustrated, it should be clear that, similarly, a rearward movement of the shift lever will cause the opposite motion of the shift cable, that is, a forward movement, which would appear as a movement to the right, in the orientation of FIGS. 2 and 3.

While in the illustrated embodiment, a fork is used to engage the pin on the shift crank, it would be possible simply to use a slot cut in a closed member; however, the fork permits a change in ratio of movement between the shift lever and the cable to accommodate changes in ratio of the transmission, which is being controlled by the transmitter assembly. As the ratio is changed, the relationship between the fork and the crank arm can be adjusted to slide the pin upwardly or downwardly within the slot formed between the fingers to accommodate such ratio changes. If a closed member were used, and the system designed for a single type of transmission with a fixed ratio it would still be necessary to make the opening for the pin slightly larger than the diameter of the pin to provide some small vertical clearance as there is some minor vertical movement of the pin 36 during operation of the shift crank 38 and gearshift lever 12. Typically, the shift cable 16 moves ±1 inch, i.e., a total of two inches of travel, in shifting the transmission. The desired handle stroke of the gearshift lever handle 15 is ±3 inches to ±5 inches; for a range of six to ten inches of total motion. Since the gearshift lever is approximately 24 inches long in order to place the end of the gearshift lever at a correct height for easy operation by a truck operator, the linkage created by the fork member and the shift crank is arranged to provide the correct travel of the respective members of the transmitter assembly.

The selection of the gear rail in the transmission is effected by movement of the gearshift lever in a transverse or side-to-side direction. The select cable 14 moves in a longitudinal direction to transmit the control from the operator to the receiver unit located adjacent the transmission. It is therefore necessary that the transmitter linkage transform the transverse motion of the gearshift lever to a longitudinal motion of the shift cable 14. As described earlier, transverse movement of the shift lever 12 pivots the entire center arm assembly 24 about pins 30 and 32. Such motion of the center arm 24 carries with it the shift crank but does not cause any longitudinal motion of the shift cable 16. A select crank 50 is pivotally mounted on the pin 40 passing through the collar formed at the bottom of the finger 24a of center arm 24 and is capable of pivotal motion in a fore/aft direction. At the upper end of the select crank 50 is a ball 52 that is one element of the ball-and-socket coupling, the socket member 54 being attached to a slide rod 56 that is part of the terminal assembly 57 attached to select cable 14. Pivotal motion of the select crank 50 in the fore/aft direction therefore effectuates longitudinal or fore/aft linear movement of the select cable 14. A ball member 58 is mounted at the end of a pin 60 and then the pin 60 is inserted into a bore in the lower end of the select crank 50 vertically aligned with the axis of rotation of the select crank. The ball 58 engages a socket 64 at a first end of a select link member 66. A second end of the select link member 66 has a socket member 68 affixed thereto that engages a ball 70 on the end of a pin 72 that is mounted to the case of the transmitter unit. The length of the link member 66 is chosen such that upon pivotal movement of the center arm 24 about the longitudinal axis the select link 66, since it is affixed at one end to the case, forces a fore/aft pivotal motion of the select link 50. In this manner, the transverse pivotal motion of the gearshift lever 12 is transformed into a fore/aft pivotal motion of the select link 50 and in turn a linear longitudinal movement in the fore/aft direction of the select cable 14.

The interactions involved in moving select cable 14 are illustrated in FIGS. 4, 5 and 6. FIG. 4 shows the shift lever 12 in the neutral or vertical position. In this state, the select crank 50 is also in the vertical position. Upon movement of the shift lever 12 to the right, as shown in FIG. 5, the center arm 24 is pivoted to the right about the axis of pins 30 and 32. The lower end of link member 66 is carried with the center arm; however, the upper end of the link member 66 is affixed to the case and cannot translate. Since the link member 66 is inextensible, the otherwise binding effect of the motion of the lower end of the rod is transformed by the ball-and-socket couplings at the ends of the rod into a fore-/aft displacement of the lower end of the link member 66, which causes a cooperative fore/aft tilt of the select crank 50. As best seen in FIG. 6, the select crank 50 pivots about pin 40 to the right, which corresponds to a forward motion since FIG. 6 is a side view. The select crank 50 carries with it the ball-and-socket coupling 52, 54 and thereby the slide rod 56. Thus, the select 14 cable is also moved in a forward direction by the sideward tilt of the gearshift lever 12.

Typically, as shown in FIG. 7, the casing 10 of the transmitter will contain a series of holes at predetermined locations so that the fixation point of the pin 72 to the casing can be changed to accommodate transmissions of different ratios, a particular hole in the casing being associated with a transmission of given ratio. The typical movement of the select cable to cause proper selection of the transmission gears is ±1 inch or a total travel of two inches. Given a lever arm for the gearshift lever of 24 inches in length, the shift crank 50, select link 66, and center arm 24 are typically designed to provide a handle movement by the operator of a range of ±2 inches to ±3 inches for a total movement range of four to six inches to effectuate such two-inch range of travel of the select cable.

It will be noted that while the transverse or side-to-side movement of the gearshift lever 12 causes a linear movement of the select cable 14, it has no effect on the shift cable 16. Conversely, the fore/aft motion of the gearshift lever 12, which causes a linear fore/aft motion of the shift cable 16, has no effect on the select crank 50 and, therefore, causes no motion of the select cable 14.

The shifting and selecting motions of the gearshift lever 12 are therefore independent of one another.

Figure 8:
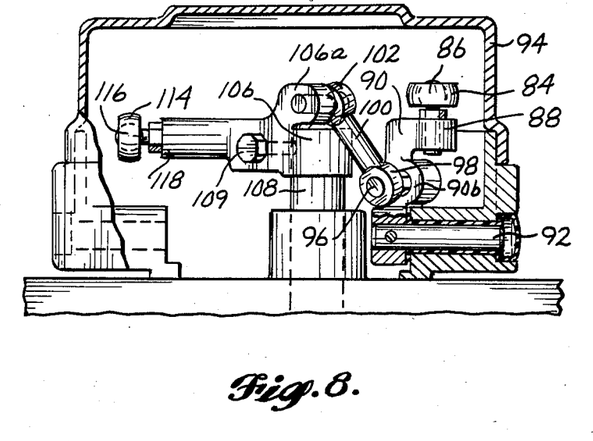
FIG. 8 is a front elevational view of the receiver assembly of FIG. 1.

At the receiver unit, shown in FIGS. 1 and 8, select cable 14 has a terminal assembly 80 that includes an extendable rod 82 that terminates in a socket fitting 84 of a ball-and-socket coupling. The ball fitting 86 of that coupling is mounted to an ear 88 of a crank arm assembly 90 that is pivotable about a transverse axis and is mounted on a pin 92 affixed to the case 94 of the receiver assembly. The crank assembly 90 includes a planar portion 90a vertically oriented as shown in FIG. 1, and parallel to the longitudinal axis of the receiver. The ear member 88 extends transversely from the planar member 90a and essentially orthogonal to it. A second ear 90b extends obliquely from the planar member 90a and is oriented and positioned such that pivotal motion of the ear 88 about the axis of pin 92 is translated into an arcuate motion of the ear 90b. The ear 90b has a ball element 96 mounted to it, which is a part of a ball-and-socket coupling. The socket portion 98 of the ball-and-socket coupling is at one end of a linear link member 100 and the other end of the link member 100 has a socket member 102 attached to it that engages a ball member 104 attached to an ear 106a integrally formed with a rotational coupling member 106 that surrounds a shaft 108 that extends out from the case of the receiver unit. The link member 100 is designed such that the arcuate motion of the ear 90b is transformed into a linear motion in a vertical direction, as pictured in FIG. 1, of the ear 106a. The collar member 106 is tightly clamped on the rod 108 by a threaded bolt 109 so that motion of the ear 106a carries with it the rod 108. The rod 108 extending from the receiver case extends into the transmission associated with the receiver and is utilized to move a member in the transmission that selects the desired gear rail in the transmission. Engagement of the gears in the transmission is caused by a rotational movement of the same rod 108 and the rotation of the rod 108 is caused by the movement of the shift cable 14 in response to motion of the gearshift lever 12.

Again, referring to FIGS. 1 and 8, the shift cable 16 enters the receiver unit and has a terminal assembly 110 attached to it. The terminal assembly 110 includes an extendable rod 112 that terminates in a socket fitting 114 of a ball-and-socket coupling. The ball member 116 of that ball-and-socket coupling is mounted to the end of an arm 118 that extends from the rotational collar 106 clamped to rod 108. Fore/aft movement of the cable 16 causes fore/aft movement of the extendable rod 112, which, in turn, causes a rotational movement about its own axis of the rod 108. Thus, the rotational movement of the rod 108 in response to the movement of the cable 16, which, in turn, is in response to the movement of the shift lever 12, causes engagement of the selected gears in the transmission to which the receiver unit is coupled. The critical feature of the receiver unit is that while the same rod 108 is utilized to actuate both selection and engagement of the gears in the transmission, it is necessary to keep the selection and shifting motions independent of one another. The length of the link 100 and the position and angle of the ears 90b and 106a are chosen such that the rotational movement of the collar 106 in response to the linear movement of the shift cable 16 does not in any way affect the linear position of the rod 108 as determined by the select cable 14 and link 100. Likewise, linear up and down movement of the rod 108 induced by movement of select cable 14 will not have an effect on the movement of the shift cable 16 because of their orthogonal relationship.

Figure 9:
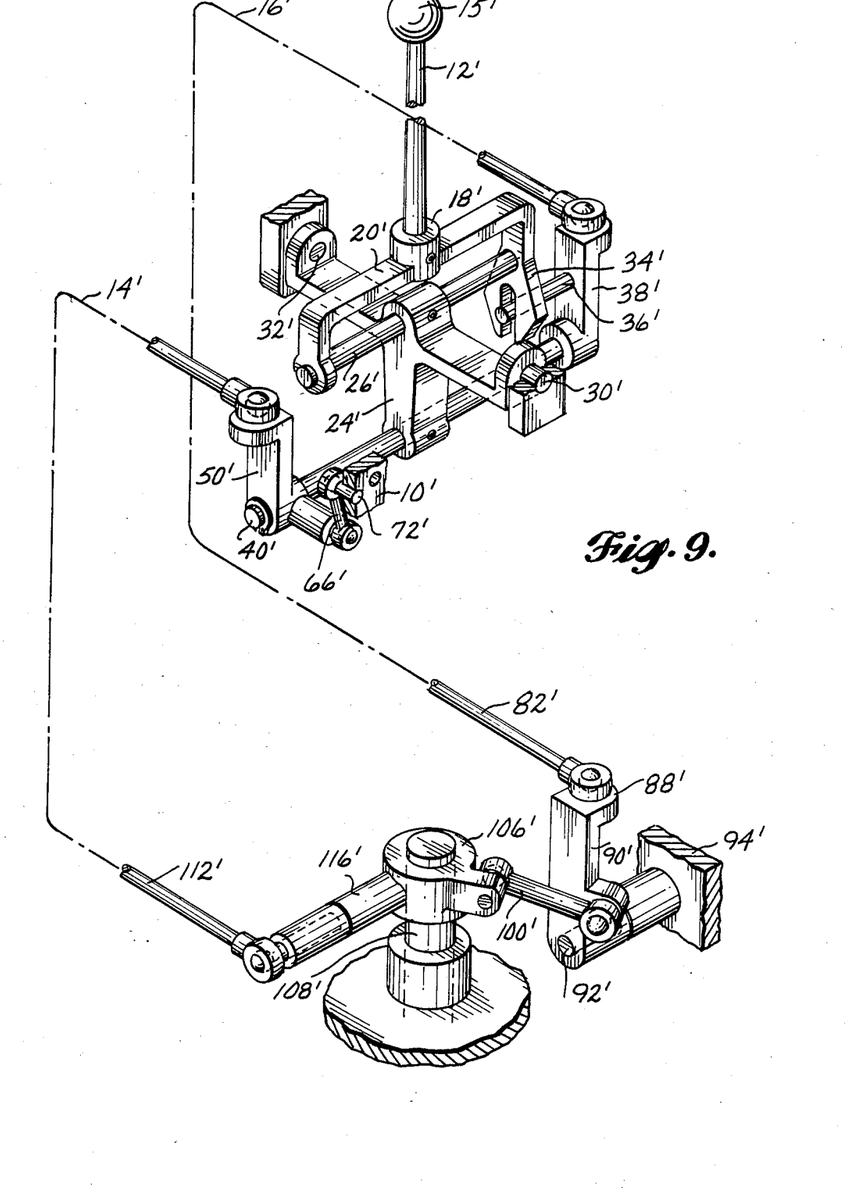
FIG. 9 is a somewhat schematic representation of a transmitter and receiver pair made in accordance with the principles of the present invention.

Referring to FIG. 9, in order to better show the movement of the various portions of the transmitter and receiver assemblies, the transmitter and receiver are shown in somewhat schematic form and are reduced to their basic moving parts. It can be seen that the transmitter consists of the gearshift lever 12' that moves in two basic modes, both fore/aft and in a transverse plane. The yoke assembly 20' and the center arm assembly 24' form essentially a universal joint that permits motion of the gearshift lever in the fore/aft plane about pivotal pin 26' without causing any motion in the transverse direction. Likewise, motion in a transverse direction causes the center arm to pivot about pins 30' and 32' without causing any fore/aft motion of either the gearshift lever or the yoke 20'. FIG. 9 clearly shows the select link 66' tied at its upper end to the casing 10' of the transmitter and attached at the lower end to the select crank arm 50'. Each end of the select link 66' has a ball-and-socket assembly associated with it to provide the necessary freedom of motion to translate the transverse motion of gearshift lever 12' into longitudinal linear motion of the select cable 14'.

The schematic representation of the receiver shown in FIG. 9 more clearly shows the connecting link 100' having a ball and socket on each end thereof for translating the longitudinal linear motion of select cable 14' into a linear motion of the rod 108' in a vertical direction. The shift cable 16' is connected by a ball-and-socket joint directly to a lever arm 118' extending from the collar 106' clamped to the rod 108' so that the linear motion of the shift cable 16' is translated to rotational movement of the rod 108'. Again, the critical feature is that link 100' must be sized and the angle such that even though both the shift cable 16' and select cable 14' are connected to the rod 108', the rotational motion of the rod does not have an effect on the vertical/linear motion of the rod caused by movement of the select cable and, likewise, the movement of the select cable does not cause any rotational movement of the rod so that the two cable inputs remain independent of one another at all times.

While the transmitter and receiver of the present invention have been described as a pair, the essential function of the transmitter is to cause the motion of the gearshift lever by the operator to be translated into independent linear motions of two cables exiting the transmitter. Likewise, the function of the receiver is to take an input that consists of linear motion of two independent push-pull cables, one of which indicates gear selection and one that indicates shifting, and couple those inputs to a transmission in a manner to actually cuase a shift of gears in the transmission. Therefore, one of ordinary skill in the art can see that any receiver that accepts the linear motion of two independent shift and select cables can be operated through use of the transmitter of the present invention and, likewise, the receiver of the present invention can accept an input in the form of linear motion of two independent shift and select cables from any transmitter that outputs those types of signals. While the preferred embodiment of the invention couples the receiver and transmitter described and illustrated, the transmitter of the present invention could be used with a receiver, for example, of the type described in my copending U.S. patent application, Ser. No. 340,537 and, likewise, the receiver of the present invention could be used with a transmitter of the type described in my copending patent application Ser. No. 340,537, as long as the transmission was compatible with the receiver used. Further, while the illustrations herein show the receiver unit oriented such that the output shaft from the receiver is oriented vertically and the receiver would be mounted on the top of a transmission case, it would be possible also to mount the receiver on the side of the transmission or even underneath the transmission if the transmission was oriented such that the select and shifting motions of the internal workings of the transmission were compatible with the output motions of the output shaft from the receiver. Therefore, while a preferred embodiment of the invention has been described and illustrated, it will be understood by those of ordinary skill in the art and others that changes can be made to the invention without departing from the spirit and scope of the present invention. The invention should therefore be defined solely with reference to the appended claims.

The embodiments of the invention in which an exclusive property or privilege is claimed are defined as follows:

1. In a dual-linkage remote shifter apparatus including a transmitter unit easily accessible by an operator of a vehicle and a receiver unit located remote from the transmitter unit adjacent a vehicle transmission, an improved transmitter unit comprising:

a casing;

an elongated control member;

first means for mounting said control member to said casing for movement of said control member about a first axis and independent movement of said control member about a second axis orthogonal to said first axis, said mounting means being constructed and arranged such that as said control member moves about said first axis said second axis also moves about said first axis to maintain said second axis orthogonal to said control member;

a first output link coupling said transmitter unit to said receiver unit;

first linkage means coupling said control member to said first output link and operable such that motion of said control member about said first axis results in linear movement of said first output link in a direction parallel to said first axis;

a second output link independent of said first output link coupling said transmitter unit to said receiver unit; and second linkage means connecting said control member to said second output link and operable such that motion of said control member about said second axis results in linear motion of said second output link in a direction orthogonal to said second axis.

2. The transmitter unit of claim 1 wherein said first and second output links are the respective movable members of flexible coaxial pushpull cables.

3. In a dual-linkage remote shifter apparatus including a transmitter unit easily accessible by an operator and a receiver unit located remotely from the transmitter unit and adjacent a vehicle transmission, an improved receiver unit comprising:

a casing;

an output rod and means for mounting said output rod in said casing for linear longitudinal movement of said rod and rotative movement of said rod;

a first input link coupled to said rod linearly movable to impart longitudinal linear movement to said rod;

a second input link coupled to said rod linearly movable to impart rotative movement to said rod;

first linkage means connecting said first input link to said rod, said first linkage means including an input crank pivotally mounted at a first end thereof to said casing, said second end of said crank being connected to said first input link by a ball-and-socket coupling such that linear movement of said first input link causes swinging movement of said first input crank, said input crank including an ear located between said first and second end of said crank extending obliquely from said crank and having connected thereto by means of a ball-and-socket coupling the first end of a link rod, the second end of said link rod being attached by a ball-and-socket coupling to a collar affixed to said output rod, the length of said link rod and the angle of attachment of said link rod between said collar and said ear of said crank being such that the swinging movement of said first input crank is transformed into a longitudinal linear movement of said rod;

an input arm extending transversely from said collar, said input arm being connected at its outer end by means of a ball-and-socket coupling to said second input crank such that linear movement of said second input crank causes rotative movement of said rod, said link rod being further configured and arranged such that the linear movement of said rod is independent of and unaffected by said rotative movement of said rod and said rotative movement of said rod is independent of and unaffected by said linear movement of said rod.

4. The improved receiver unit of claim 3 wherein said first and second input links are respective movable elements of flexible coaxial push-pull cables.

5. In a dual linkage remote shifter apparatus including a transmitter unit easily accessible by an operator of a vehicle and a receiver unit located remotely from the transmitter unit adjacent a vehicle transmission, an improved transmitter unit comprising:

a casing;

an elongated control member;

first means for mounting said control member to said casing for movement of said control member about a first axis and independent movement of said control member about a second axis orthogonal to said first axis, said first mounting means including a center arm assembly journalled for swinging movement with respect to said casing about said first axis, said center arm assembly having a first pin mounted thereon along said second axis, and a yoke having first and second arms, said yoke being oriented parallel to said second axis, and said first and second arms being swingably mounted on said pin for swinging movement of said yoke about said second axis, said control member being affixed at a first end thereof to said yoke intermediate the points of attachment of said first and second arms to said pin;

a first output link coupling said transmitter unit to said receiver unit;

first linkage means coupling said control member to said first output link and operable such that motion of said control member about said first axis results in linear movement of said first output link in a direction parallel to said first axis, said first linkage including a first crank rotatably mounted at its first end to said center arm assembly for rotation of said crank about an axis parallel to said second axis independent of said center arm, said first link being coupled to a second end of said first crank, said first linkage means further including a control link having first and second ends, said first end being coupled by a ball and socket coupling to said casing, and said second end being coupled by a ball and socket coupling to said first end of said first link, the point of attachment of said control link to said casing and the length of said control link being such that movement of said control member about said first axis results in swinging movement of said first crank about an axis parallel to said second axis;

a second output link independent of said first output link, coupling said transmitter unit to said receiver unit; and second linkage means connecting said control member to said second output link and operable such that motion of said control member about said second axis results in linear motion of said second output link in a direction orthogonal to said second axis, said second linkage means including a second crank rotatably mounted on said center arm coaxially with said first crank for swinging movement of said second crank independent of both said center arm assembly and said first crank, said second end of said second crank being attached to said second output link and including a pin extending toward the center arm assembly from said second crank, said pin being held captive within a slot formed in a control arm extending from said first arm of said yoke and integrally formed with it, said control arm and said pin cooperating such that movement of said control arm about said second axis results in movement of said second crank about an axis parallel to said second axis and offset therefrom.

6. The transmitter unit of claim 5 wherein said first and second output links are the respective movable members of flexible coaxial push/pull cables.

7. The transmitter unit of claim 5 wherein said control arm comprises a fork having first and second fingers spaced from one another to form said slot, said pin extending from said second crank being held captive between said first and second fingers of said fork.

8. The transmitter unit of claim 5 wherein said casing has a plurality of holes formed therein and said ball-and-socket coupling of said control link includes a ball having a pin extending therefrom insertable into one of said plurality of holes in said casing, said holes being positioned to accommodate selected ratio vehicle transmissions.

* * * * *